United States Patent
Patel et al.

(10) Patent No.: US 11,905,576 B2
(45) Date of Patent: Feb. 20, 2024

(54) COMPACT COIL ASSEMBLY FOR A VACUUM ARC REMELTING SYSTEM

(71) Applicant: Titanium Metals Corporation, Henderson, NV (US)

(72) Inventors: Ashish D. Patel, Wyomissing, PA (US); Jeremy L Sensenig, Henderson, NV (US); Robert James McFarland, Jr., Henderson, NV (US); James Leroy Phillips, Henderson, NV (US)

(73) Assignee: TITANIUM METALS CORPORATION, Henderson, NV (US)

( * ) Notice: Subject to any disclaimer, the term of this patent is extended or adjusted under 35 U.S.C. 154(b) by 0 days.

(21) Appl. No.: 17/902,313

(22) Filed: Sep. 2, 2022

(65) Prior Publication Data

US 2022/0411895 A1    Dec. 29, 2022

Related U.S. Application Data

(62) Division of application No. 16/163,157, filed on Oct. 17, 2018, now Pat. No. 11,434,544.

(60) Provisional application No. 62/573,229, filed on Oct. 17, 2017.

(51) Int. Cl.
    *C22B 9/20*    (2006.01)
    *C22B 9/22*    (2006.01)
    *H05B 7/20*    (2006.01)

(52) U.S. Cl.
    CPC ............... *C22B 9/20* (2013.01); *C22B 9/221* (2013.01); *H05B 7/20* (2013.01)

(58) Field of Classification Search
    CPC .................................. C22B 9/20; C22B 9/221
    See application file for complete search history.

(56) References Cited

U.S. PATENT DOCUMENTS

| | | | | |
|---|---|---|---|---|
| 3,246,373 A | * | 4/1966 | Lyman | F27D 27/00 164/136 |
| 2019/0112688 A1 | * | 4/2019 | Patel | H05B 7/20 |
| 2021/0286024 A1 | * | 9/2021 | Cibula | F27D 19/00 |
| 2022/0411895 A1 | * | 12/2022 | Patel | F27D 11/08 |

FOREIGN PATENT DOCUMENTS

RU    2536561 C1 * 12/2014

* cited by examiner

*Primary Examiner* — Scott R Kastler
(74) *Attorney, Agent, or Firm* — Burris Law, PLLC

(57) ABSTRACT

A method of vacuum arc remelting an ingot provided in a crucible assembly having an electrode includes generating a rotating magnetic field normal to a longitudinal axis of the ingot and localized to an arc region during remelting. The rotating magnetic field interacts with a melting current to produce a rotating arc directed radially outward.

20 Claims, 3 Drawing Sheets

COMPACT COIL ASSEMBLY FOR A VACUUM ARC REMELTING SYSTEM

CROSS-REFERENCE TO RELATED APPLICATIONS

This application is a divisional of U.S. patent application Ser. No. 16/163,157, filed Oct. 17, 2018, which claims priority to and the benefit of U.S. provisional application No. 62/573,229, filed on Oct. 17, 2017. The disclosures of the above applications are incorporated herein by reference.

FIELD

The present disclosure relates to a vacuum arc remelting system.

BACKGROUND

The statements in this section merely provide background information related to the present disclosure and may not constitute prior art.

A vacuum arc remelting (VAR) process is generally used in the processing of high performance titanium, zirconium, nickel based alloys and steel, among other alloys. Generally, a VAR system gradually melts an electrode by an electric current that flows through the electrode and arcs to molten metal contained within a crucible. The applied melting current is varied during the process, to achieve the desired molten metal pool geometry. At times, the electric arc can cause beads of metal to spatter onto portions of the crucible wall that are above the molten metal. These portions are cold and can solidify the beads into a porous nonhomogeneous mass, which can cause surface irregularities in the ingot. Issues related to VAR ingot surface quality and internal quality, and other issues are addressed by the present disclosure.

SUMMARY

This section provides a general summary of the disclosure, and is not a comprehensive disclosure of its full scope or all of its features.

In one form of the present disclosure, a method of vacuum arc remelting an ingot provided in a crucible assembly having an electrode is provided. The method comprises generating a rotating magnetic field normal to a longitudinal axis of the ingot and localized to an arc region during remelting. The rotating magnetic field interacts with a melting current to produce a rotating arc directed radially outward.

In variations of the method, which may be implemented individually or in combination: the method includes moving an electromagnetic energy source along the longitudinal axis of the ingot as the ingot is being formed, wherein the electromagnetic energy source generates the rotating magnetic field; the method includes providing electric current to an electromagnetic energy source having a coil assembly to generate the rotating magnetic field; the generating the rotating magnetic field further comprises cycling electric current through the coil assembly in a sinusoidal manner with a predetermined phase angle offset to generate the rotating magnetic field; the coil assembly includes a plurality of coil pairs; the method includes controlling the direction of the rotating magnetic field generated by the electromagnetic energy source based on an energizing sequence of each of the plurality of coil pairs such that the arc is swept along a direction of the ingot; the coil assembly includes a plurality of coil pairs; the method further comprises enabling bi-directional current flow in each coil of the plurality of coil pairs; the method includes adjusting a height of the coil assembly based on a height of an ingot melt, wherein the height of the coil assembly is localized at a gap between the electrode and the ingot during remelting; the method includes moving the rotating magnetic field along an axis parallel to the longitudinal axis of the ingot as the ingot is being formed; and/or the moving the rotating magnetic field along the axis parallel to the longitudinal axis further comprises moving an electromagnetic energy source, the crucible assembly, or a combination thereof along the axis parallel to the longitudinal axis of the ingot.

In one form of the present disclosure, a method of vacuum arc remelting an ingot provided in a crucible assembly having an electrode is provided. The method comprising providing electric current to an electromagnetic energy source having a coil assembly to generate a rotating magnetic field that is perpendicular to a normal axis of the coil assembly; controlling a direction of the rotating magnetic field based on the electric current applied to the coil assembly of the electromagnetic energy source; and moving the coil assembly along a longitudinal axis of the crucible assembly to control a position of the coil assembly at a gap between the electrode and the ingot during remelting.

In variations of the method, which may be implemented individually or in combination: the method includes adjusting a height of the coil assembly based on a height of an ingot melt, wherein the height of the coil assembly is localized at the gap between the electrode and the ingot during remelting; the providing the electric current comprises enabling bi-directional current flow in each coil of the coil assembly, the method includes cycling the electric current through a plurality of coil pairs of the coil assembly in a sinusoidal manner with a predetermined phase angle offset to generate the rotating magnetic field; the coil assembly includes a plurality of coil pairs; and/or the method includes controlling the direction of the rotating magnetic field generated by the electromagnetic energy source based on an energizing sequence of each of the plurality of coil pairs such that the arc is swept along a direction of the ingot.

In one form of the present disclosure, a method of vacuum arc remelting an ingot provided in a crucible assembly having an electrode is provided. The method comprising generating a rotating magnetic field normal to a longitudinal axis of the ingot using an electromagnetic energy source having a coil assembly; controlling a direction of the rotating magnetic field generated by the electromagnetic energy source based on an energizing sequence of each of a plurality of coil pairs of the coil assembly to have a rotating arc swept along a direction of the ingot; and moving the rotating magnetic field along an axis parallel to the longitudinal axis of the ingot as the ingot is being formed.

In variations of the method, which may be implemented individually or in combination: the rotating magnetic field is localized to a gap between the electrode and the ingot, the rotating magnetic field interacts with a melting current to produce a rotating arc directed radially outward; the moving the rotating magnetic field along the axis parallel to the longitudinal axis of the ingot further comprises moving the electromagnetic energy source, the crucible assembly or a combination thereof along the axis parallel to the longitudinal axis of the ingot based on a height of the ingot melt; the moving the rotating magnetic field along the axis parallel to the longitudinal axis of the ingot further comprises moving the electromagnetic energy source along the axis parallel to the longitudinal axis of the ingot to have the coil assembly localized at a gap between the electrode and the ingot during remelting; the generating the rotating magnetic field further comprises cycling electric current through the coil assembly of the electromagnetic energy source in a sinusoidal manner with a predetermined phase angle offset; and/or the method includes maintaining the crucible assembly in a stationary position such that the crucible assembly contains the ingot and the rotating magnetic field is moved relative to the ingot as the ingot is being formed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
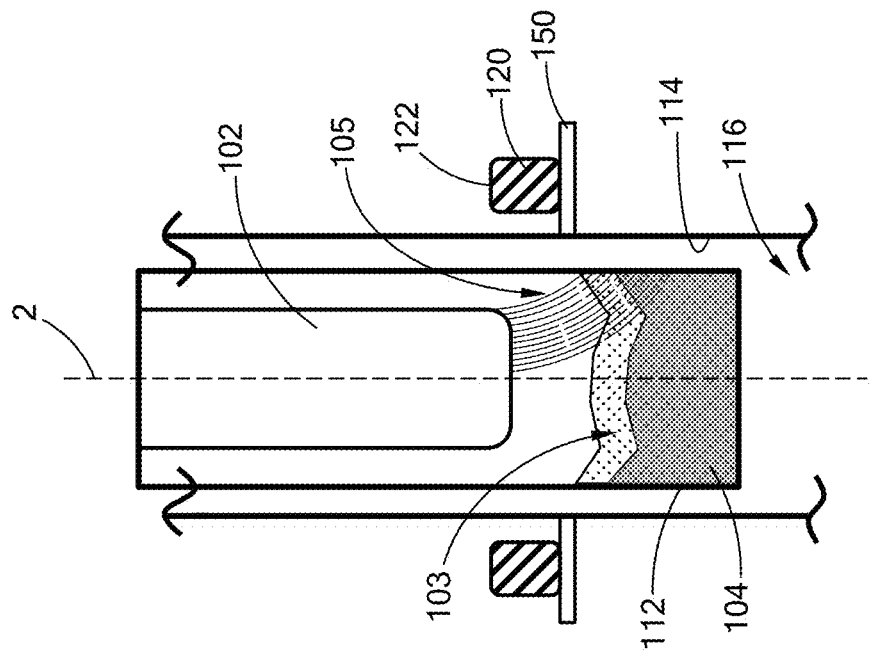
FIG. 2 is a partial cross-sectional view of the VAR system of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To address the surface irregularities of the formed ingot, a VAR system may include large stationary coils in a Helmholtz configuration that are arranged around a crucible. The stationary coils extend along the entire length of the crucible and are used to generate a transverse magnetic field. Such VAR system is described in detail in U.S. Pat. No. 4,581,745 which is commonly assigned with the present application and the disclosure of which is incorporated herein by reference.

While the VAR system having the Helmholtz configured coils may reduce surface irregularities, the coils have to be placed a significant distance away from the crucible. In addition, due to their large size, the coils require more power to generate the required magnetic field.

Generally, a VAR system of the present disclosure includes an electromagnetic energy source and a lift mechanism for moving the electromagnetic energy source with the growing molten metal (i.e., ingot), such that the magnetic field is localized. In one form, the electromagnetic energy source is a compact coil assembly, and as described further herein, in one form, the coil assembly includes a ring shaped magnetic core, made up of a high permeability material and wound with insulated wires. The coil assembly is operable to generate a rotating magnetic field that is perpendicular to the normal axis of the coil assembly. This rotating magnetic field generated interacts with the melting current to move the arc radially in a direction perpendicular to the normal axis of the electrode and ingot.

Although the lift mechanism is illustrated and described as moving the electromagnetic energy source relative to the ingot, it should also be understood that the ingot may be moved relative to the electromagnetic energy source, or both the electromagnetic energy source and the ingot may move while remaining within the scope of the present disclosure.

One form of the VAR system of the present disclosure will now be described with reference to the accompanying drawings.

Figure 1:
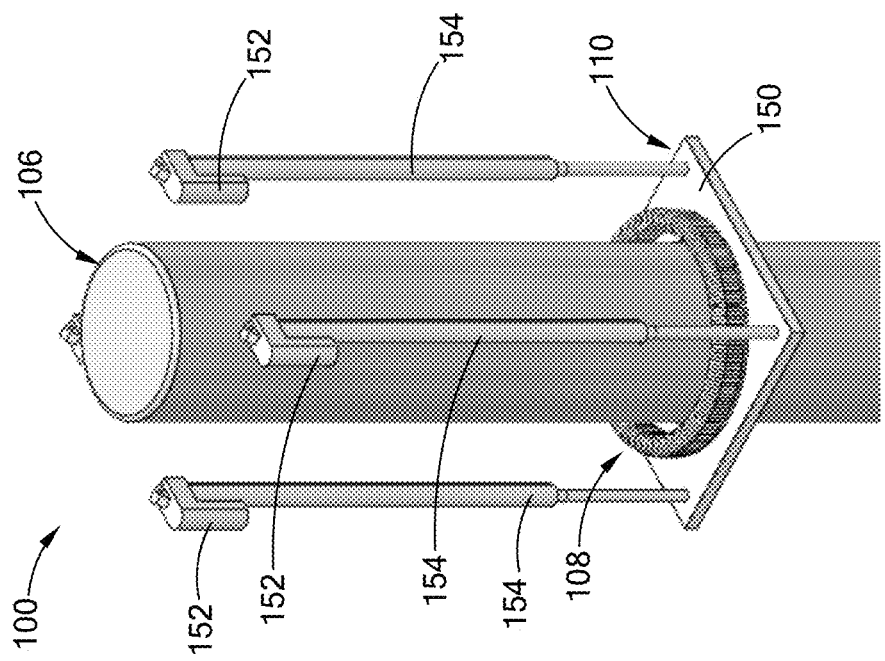
FIG. 1 is a perspective view illustrating a VAR system having a coil assembly and a lift mechanism in accordance with the teachings of the present disclosure.

Referring to FIGS. 1 and 2, a VAR system 100, which may also be referred to as a VAR furnace, is used to gradually melt an electrode 102 to form an ingot 104, which has a pool of molten metal 103. In one form, the VAR system includes a crucible assembly 106, a coil assembly 108 (i.e., electromagnetic energy source) arranged about the crucible assembly 106, and a lift mechanism 110 for moving the coil assembly 108 along an exterior of the crucible assembly 106.

The crucible assembly 106 accommodates the electrode 102 and holds the ingot 104 formed from the electrode 102. In one form, the crucible assembly 106 includes a crucible 112 ("crucible" hereinafter) and a cooling member 114 that defines a chamber 116 around the crucible 112 for receiving a coolant, such as water, to reduce the temperature of the crucible 112. Other suitable systems for cooling the crucible may also be used and are within the scope of the present disclosure. The crucible 112 and the cooling member 114 may be made of nonmagnetic material such as cooper and stainless steel.

During the remelting process, electrical arcs that function to melt the electrode 102 extend between the electrode 102 and an inner wall of the crucible 112, generally defining an arc region 105 as shown. Advantageously, as described in greater detail below, the magnetic fields generated by an electromagnetic energy source are localized to this arc region 105 (or in other words, limited to this arc region 105 rather than along the entire crucible 112, or a substantial portion thereof) during remelting, thereby resulting in improved surface quality of the ingot 104 and reducing the amount of electrode remnant at the end of the remelting process.

The coil assembly 108 is positioned adjacent to the crucible 112 assembly and moves along a longitudinal axis 2 of the crucible 112, the crucible assembly 106, and the ingot 104 as the ingot 104 grows. The coil assembly includes a core 120 with plurality of coils 122 wrapped around the core 120. As described further below, the core 120 and the coils 122 are operable to form a transverse magnetic field that is substantially confined to a gap between the electrode 102 and the ingot 104. In one form, the core 120 is a ring-shaped toroid with a rectangular cross-section and is constructed by stacking layers of a high permeability ferromagnetic material, such as annealed electrical steel. The core can be configured in other suitable shapes and material and should not be limited to the examples provided herein.

Figure 3:
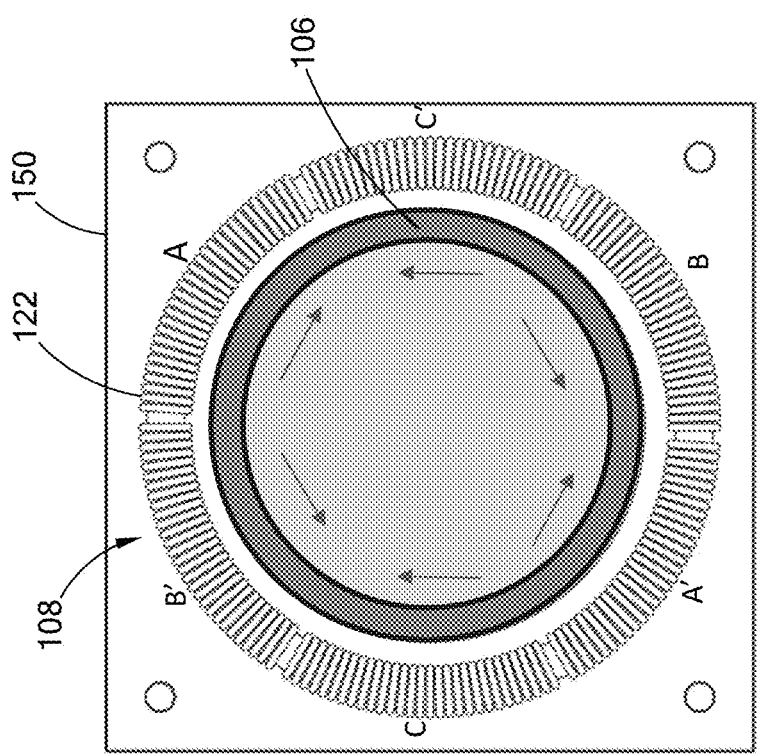
FIG. 3 is a partial top view of the VAR system of FIG. 1.

The coils 122 may be an insulated solid copper wire or a hollow copper tube that is wound around the core 120. The windings are split to form one or more coil pairs, where coils of a coil pair are arranged on opposite sides of the core 120. For example, referring to FIG. 3, the coil assembly 108 includes three coil pairs (e.g., coil pair A-A'; coil pair B-B'; and coil pair C-C'), where the coils of each pair are arranged on opposite sides of the core. Each coil pair is configured to receive a sinusoidal current, with the current in each pair being 120° out of phase. The direction of the magnetic field from each pair is represented by the arrows in FIG. 3.

Figure 4:
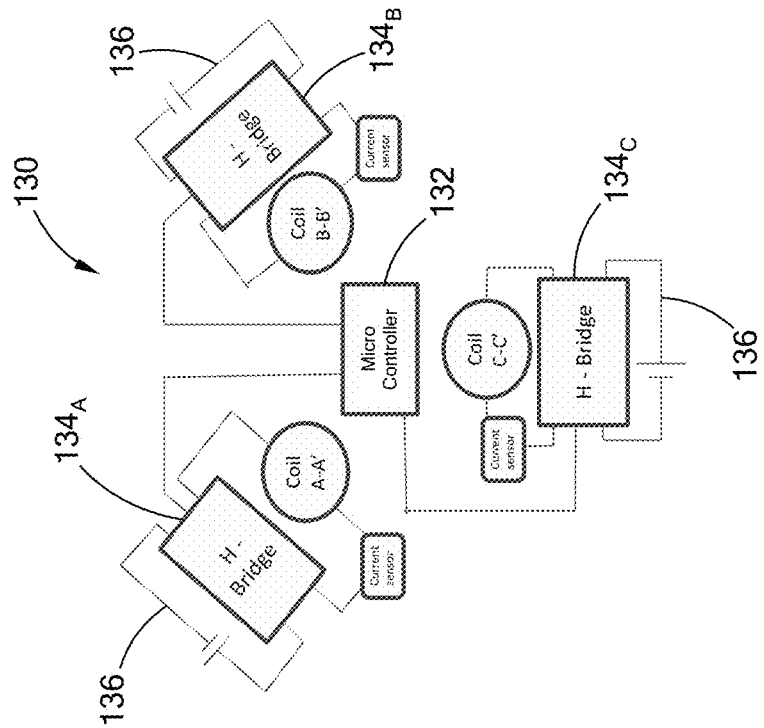
FIG. 4 is a schematic diagram illustrating a coil controller in accordance with the teachings of the present disclosure.

To control the current through the coil assembly 108 and thus, control the magnetic field, the VAR system 100 further comprises a coil current controller. Referring to FIG. 4, a coil current controller 130 includes a microcontroller 132, at least one H-bridge for each coil pair (e.g., H-bridges 134A, 134B, and 134C for coil pairs B-B'; and C-C', respectively), and one or more DC power supplies 136. The H-bridges 134A, 134B, and 134C may collectively be referred to as H-bridges 134. The H-bridges 134 enable bi-directional current flow in the respective coil pairs.

The microcontroller 132 is programmed to control the magnetic field by controlling the current through the coil pairs. More particularly, the maximum current, which also limits the maximum magnetic field that can be generated, is determined based on a ratio of a power supply voltage from the DC power supply 136 and a resistance of the coils 122. The current in each coil pair at any instant is given by Equations 1-3 below, where $V_o$ is the power supply voltage, R is the resistance of each coil pair, ω is the angular frequency (i.e., ω=2πf), and t is time.

$$I_{A-A'} = \frac{V_o}{R}\sin(\omega t) \qquad \text{Equation 1}$$

$$I_{B-B'} = \frac{V_o}{R}\sin(\omega t + 2\pi/3) \qquad \text{Equation 2}$$

$$I_{C-C'} = \frac{V_o}{R}\sin(\omega t + 4\pi/3) \qquad \text{Equation 3}$$

As the sinusoidal current cycles through the coil pairs, the dwell time is given by $$t_d = \frac{\theta}{f * 360},$$

where θ is the increment angle in degrees and f is the rotational frequency of the arc and is defined as $$f = \frac{RPM}{60}.$$

Each coil pair generates a magnetic field that is proportional to the instantaneous current, and the resultant magnetic field obtained from the vector sum of the three individual fields (i.e., the magnetic flux density (B)) is given by Equation 4, where $B_o$ is the field at the center of the core at maximum current, and $\hat{a}_x$, $\hat{a}_y$ are unit vectors. As demonstrated in Equation 4, the magnitude of the resultant field at the center at any instant is constant and is augmented by 1.5 times the field from the individual coil pair.

$$B = \frac{3}{2}B_o\left[\sin\left(wt + \frac{\pi}{6}\right)\hat{a}_x + \cos\left(wt + \frac{\pi}{6}\right)\hat{a}_y\right] \qquad \text{Equation 4}$$

The externally imposed magnetic field is largely confined to the gap between the electrode and ingot and causes the arc between the electrode and the ingot to move toward the wall of the crucible 112. By cycling the electric current through the coils in a sinusoidal fashion with proper phase angle offsets, a rotating magnetic field is generated. The direction of rotation of the arc (e.g., clockwise or counter clockwise) is controlled based on the sequence at which the coils are energized, and the rate of the rotation is dependent on the frequency of electrical energization of the coils. In addition, by controlling the current through the coil pairs, a suitable magnetic field can be generated to control the position of the arc. That is, the magnetic field interacts with a melting DC current to generate a force (F) on the arc, which is defined in Equation 5, where J is applied current density, and B is the magnetic flux density.

$$F = J \times B \qquad \text{Equation 5}$$

By selecting appropriate process set-points (e.g., coil resistance, power supply, phase angle offset, others), the arc is swept along the circumference of the ingot, which, in turn, helps improve the smoothness of the ingot surface.

In lieu of forming the magnetic field through the full height of the crucible, the coil assembly 108 is moved by the lift mechanism 110 in accordance with the growth of the ingot. With continuous reference to FIGS. 1 and 3, the lift mechanism 110 includes a platform 150 upon with the coil assembly 108 is positioned, and one or more drive motors 152 that are operable to gradually move the platform 150 having the coil assembly 108. In one form, the platform 150 is an insulated plate that is attached to four posts 154, where each post is controlled by a drive motor 152 for moving the platform 150.

Figure 5:
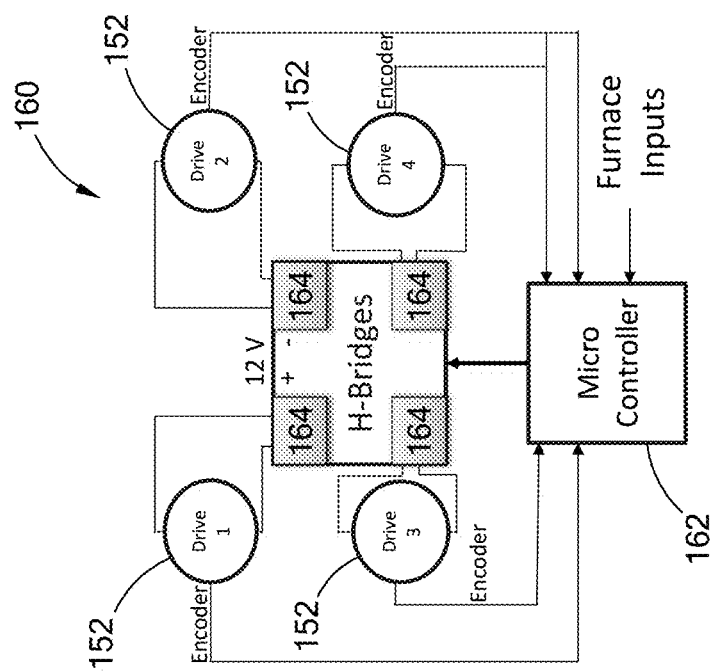
FIG. 5 is a schematic diagram illustrating a lift controller in accordance with the teachings of the present disclosure.

To control the lift mechanism 110, the VAR system 100 further includes a lift drive controller. Referring to FIG. 5, in one form, a lift drive controller 160 includes a microcontroller 162, one H-bridge 164 for each drive motor 152, where the H-bridges 164 are coupled to a DC power supply (e.g., 12V). The microcontroller 162 is programmed to adjust the height of the lift mechanism 110 based on a height of the ingot melt, which can be determined based on characteristics associated with the ingot. For example, in one form, the VAR system 100 is equipped with load cells, and thus the ingot height (h) can be estimated using the relationship set out in Equation 6 in which $\rho_i$ is the density of ingot, $A_i$ is the area of ingot, and $\dot{m}$ is the melt rate. Alternatively, if the VAR system does not include load cells, the ingot height can be estimated from the travel amount of the electrode (i.e., a ram travel) which is provided by Equation 7, in which X is the ram travel, $\rho_e$ is the density of electrode, and $A_e$ is the area of electrode. The variables in Equations 6 and 7 can be inputted to the microcontroller 162 and are represented as furnace inputs in the drawings.

$$h = \frac{1}{\rho_i A_i}\int \dot{m}\, dt \qquad \text{Equation 6}$$

$$h = \frac{X}{\left(\frac{A_i \rho_i}{A_e \rho_e} - 1\right)} \qquad \text{Equation 7}$$

Based on the foregoing, in operation, the VAR system 100 includes the coil assembly 108 that is compact and moveable by the lift mechanism 110, such that the coil assembly 108 travels as the ingot grows. The coil assembly 108 is operable to generate a localized rotating magnetic field for forming a rotating arc between the electrode and the ingot. Specifically, the magnetic field interacts with the arc plasma to accelerate it radially (i.e., perpendicular the normal axis of the electrode), thereby moving it towards the crucible. This action, in turn has a positive impact on the ingot surface quality since the thermal energy from the arc removes (melts) the splatter on the crucible, and hence as the ingot grows, it solidifies on a bare crucible, and not on a shell of splatter.

The compact design of the coil assembly enables easy retrofitting to existing VAR furnaces and requires minimal clearance around the crucible assembly. In addition, due to the compact size of the coil assembly, the voltage and current necessary to generate the magnetic field are relatively small compared to systems having larger coils that generate the magnetic field throughout the crucible. While the coil assembly is described as having three coil pairs, the scope of the present disclosure is applicable to multiple coil pairs and should not be limited to three.

The VAR system of the present disclosure is configured to position and control the arc towards the surface of the ingot and thus, significantly improve the ingot surface quality. Since, the coil traverses the arc, the external transverse field is applied only to the arc region and not to the molten metal pool. This in turn aids in obtaining the desired molten metal pool shape by confining effects of applied magnetic field to the proximity of the arc. In addition, by altering the arc behavior at the end of the process, the amount of electrode remnant, can be minimized.

In addition to controlling the coil assembly to manage the surface integrity of the ingot and the remnant shape and weight, the VAR system of the present disclosure may also be used during the melting to control the arc location, and thus, impact the overall pool shape, thereby improving the solidification structure. A further use could be during early stages of vacuum arc melting known as start up to reduce the time for startup and to improve the overall integrity of the base. In fact, any approach where the coil arrangement and control approach can be used to manage the arc location over time to yield beneficial effects can be envisioned and is within the scope of the present disclosure.

The coil current controller and the lift controller may be collectively referred to as a control system of the VAR system. While the coil current controller and the lift controller are described as having independent microcontrollers, one microcontroller may be configured to perform the operations of the coil current controller and the lift controller.

The algorithm for the coil current controller may be incorporated into existing PLC based VAR control systems using a text-based programing language. Alternatively, the coil current controller can be a standalone system.

The field strength and rotation (RPM) are software parameters that can be readily varied during different stages of a typical melt. For example, parameters can be customized for each of the following stages of heating: a startup stage, a steady state, and a hot top stage. The field strength, and rotation (RPM) can also be adjusted based on the type of alloy being melted, associated arc gap, and annulus distance.

In an experimental implementation of a VAR system of the present disclosure, a coil assembly was arranged around a 203 mm (eight-inch) VAR furnace with a 25.4 mm (one-inch) gap provided between the coil assembly and the furnace. The coil assembly had an internal diameter of 381 mm (15 inches), an outer diameter of 432 mm (17 inches), and a height of 76 mm (three inches). The coil assembly was formed by stacking 0.254 mm (0.01 inch) thick sheets of industrial grade electrical steel to form the core, and three layers of 1 mm (18 gauge) insulated copper wire was wound around the core.

Figure 6:
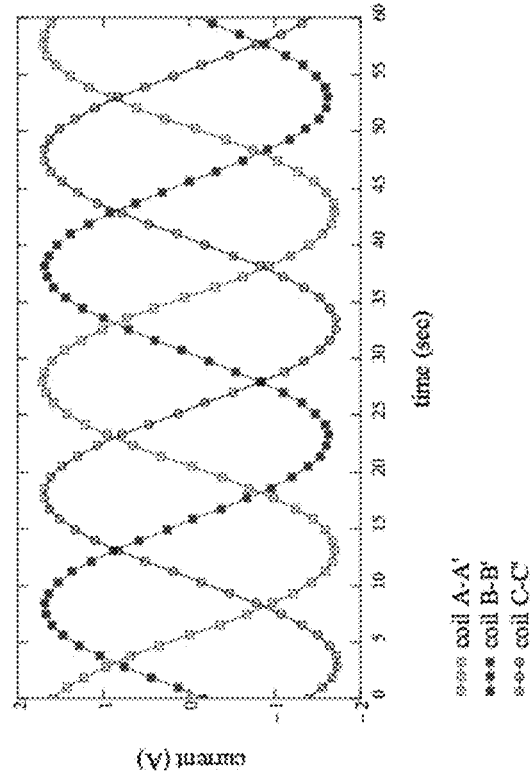
FIG. 6 is a graph of three sinusoidal current waveforms in accordance with the teachings of the present disclosure.

In one experimental finding, an electric current in the range of 0 to 1.6 A, and a voltage in the range of 0 to 10 V was sufficient to generate a maximum magnetic field of 20 G per coil pair at the center of the crucible, and a net field of 30G. The arc was rotated at 2 to 5 RPM, with increment angles in the range of 1 to 15 degrees with reversals every 5 minutes. A plot of the three sinusoidal current waveforms during the test is show in FIG. 6. Under these test conditions, in order to tract the ingot height, the lift mechanism was moved in the range of 0 to 0.5 min/min. This experimental implementation is provided to further illustrate the operation of the VAR assembly of the present disclosure and is not intended to limit the VAR assembly to parameters described in the experiment.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of vacuum arc remelting an ingot provided in a crucible assembly having an electrode, the method comprising generating a rotating magnetic field normal to a longitudinal axis of the ingot and localized to an arc region during remelting, the rotating magnetic field interacting with a melting first electric current configured to melt the electrode, wherein the rotating magnetic field interacts with the first electric current to produce a rotating arc directed radially outward.

2. The method of claim 1 further comprising moving an electromagnetic energy source along the longitudinal axis of the ingot as the ingot is being formed, wherein the electromagnetic energy source generates the rotating magnetic field.

3. The method of claim 1 providing a second electric current to an electromagnetic energy source having a coil assembly to generate the rotating magnetic field.

4. The method of claim 3, wherein the generating the rotating magnetic field further comprises cycling the second electric current through the coil assembly in a sinusoidal manner with a predetermined phase angle offset to generate the rotating magnetic field.

5. The method of claim 3, wherein the coil assembly includes a plurality of coil pairs, and the method further comprises controlling the direction of the rotating magnetic field generated by the electromagnetic energy source based on an energizing sequence of each of the plurality of coil pairs such that the arc is swept along a direction of the ingot.

6. The method of claim 3, wherein the coil assembly includes a plurality of coil pairs, and the method further comprises enabling bi-directional current flow in each coil of the plurality of coil pairs.

7. The method of claim 3 further comprising adjusting a height of the coil assembly based on a height of an ingot melt, wherein the height of the coil assembly is localized at a gap between the electrode and the ingot during remelting.

8. The method of claim 1 further comprising moving the rotating magnetic field along an axis parallel to the longitudinal axis of the ingot as the ingot is being formed.

9. The method of claim 8, wherein the moving the rotating magnetic field along the axis parallel to the longitudinal axis further comprises moving an electromagnetic energy source, the crucible assembly, or a combination thereof along the axis parallel to the longitudinal axis of the ingot.

10. A method of vacuum arc remelting an ingot provided in a crucible assembly having an electrode, the method comprising:
providing electric current to an electromagnetic energy source having a coil assembly to generate a rotating magnetic field that is perpendicular to a normal axis of the coil assembly;
controlling a direction of the rotating magnetic field based on the electric current applied to the coil assembly of the electromagnetic energy source; and
moving the coil assembly along a longitudinal axis of the crucible assembly to control a position of the coil assembly at a gap between the electrode and the ingot during remelting.

11. The method of claim 10 further comprising adjusting a height of the coil assembly based on a height of an ingot melt, wherein the height of the coil assembly is localized at the gap between the electrode and the ingot during remelting.

12. The method of claim 10, wherein the providing the electric current comprises enabling bi-directional current flow in each coil of the coil assembly.

13. The method of claim 10 further comprising cycling the electric current through a plurality of coil pairs of the coil assembly in a sinusoidal manner with a predetermined phase angle offset to generate the rotating magnetic field.

14. The method of claim 10, wherein:
the coil assembly includes a plurality of coil pairs, and
the method further comprises controlling the direction of the rotating magnetic field generated by the electromagnetic energy source based on an energizing sequence of each of the plurality of coil pairs such that the arc is swept along a direction of the ingot.

15. A method of vacuum arc remelting an ingot provided in a crucible assembly having an electrode, the method comprising:
generating a rotating magnetic field normal to a longitudinal axis of the ingot using an electromagnetic energy source having a coil assembly;
controlling a direction of the rotating magnetic field generated by the electromagnetic energy source based on an energizing sequence of each of a plurality of coil pairs of the coil assembly to have a rotating arc swept along a direction of the ingot; and
moving the rotating magnetic field along an axis parallel to the longitudinal axis of the ingot as the ingot is being formed.

16. The method of claim 15, wherein the rotating magnetic field is localized to a gap between the electrode and the ingot, the rotating magnetic field interacts with a melting first electric current configured to melt the electrode, wherein the rotating magnetic field interacts with the first electric current to produce a rotating arc directed radially outward.

17. The method of claim 15, wherein the moving the rotating magnetic field along the axis parallel to the longitudinal axis of the ingot further comprises moving the electromagnetic energy source, the crucible assembly or a combination thereof along the axis parallel to the longitudinal axis of the ingot based on a height of the ingot melt.

18. The method of claim 15, wherein the moving the rotating magnetic field along the axis parallel to the longitudinal axis of the ingot further comprises moving the electromagnetic energy source along the axis parallel to the longitudinal axis of the ingot to have the coil assembly localized at a gap between the electrode and the ingot during remelting.

19. The method of claim 15, wherein the generating the rotating magnetic field further comprises cycling a second electric current through the coil assembly of the electromagnetic energy source in a sinusoidal manner with a predetermined phase angle offset.

20. The method of claim 15 further comprising maintaining the crucible assembly in a stationary position, wherein the crucible assembly contains the ingot and the rotating magnetic field is moved relative to the ingot as the ingot is being formed.

\* \* \* \* \*